Nov. 29, 1966     K. V. KORDESCH     3,288,642
RECHARGEABLE DRY CELL HAVING GELLED ELECTROLYTE
Filed Jan. 5, 1961     4 Sheets-Sheet 1
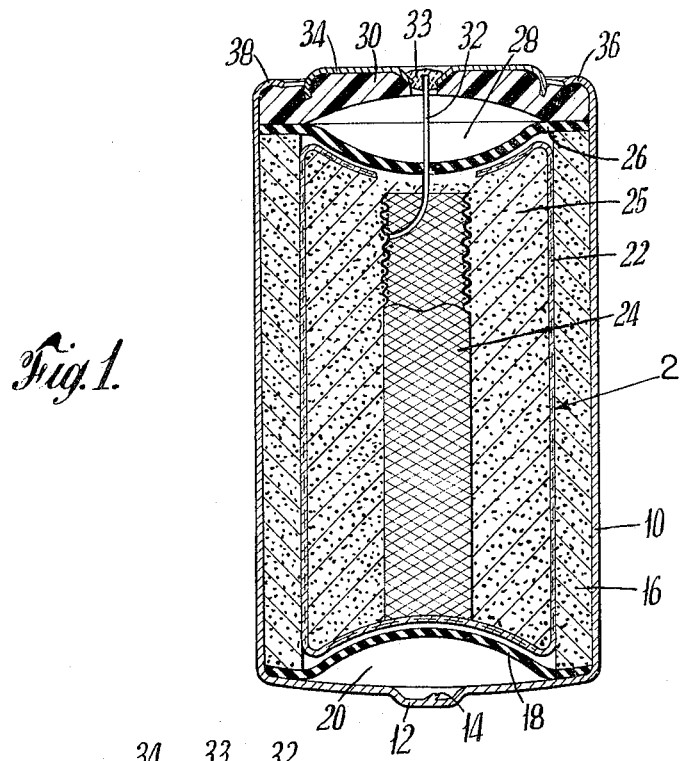
Fig. 1.
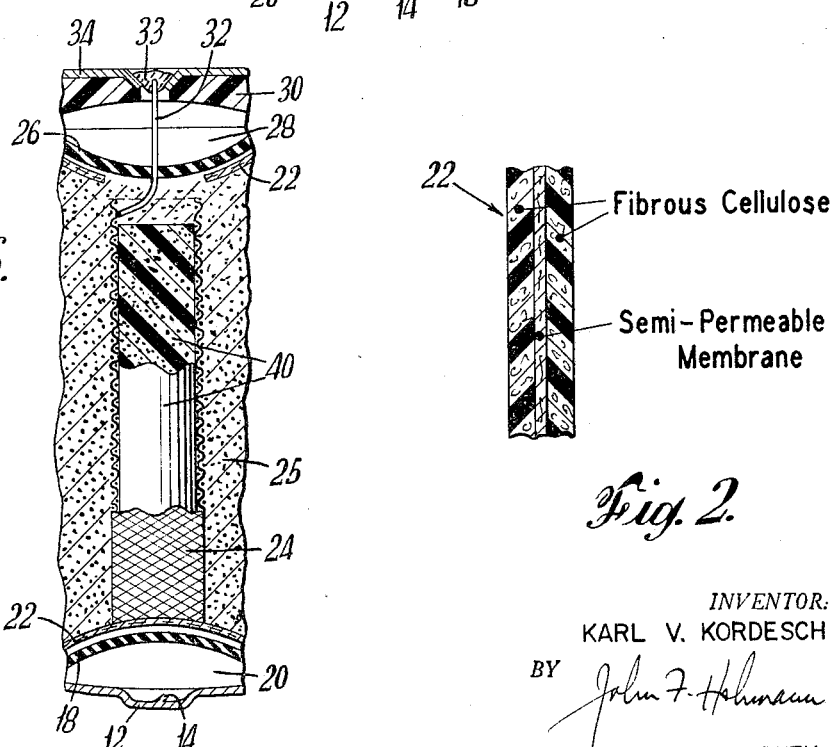
Fig. 6.
Fig. 2.
INVENTOR.
KARL V. KORDESCH
BY John F. Hohmann
ATTORNEY

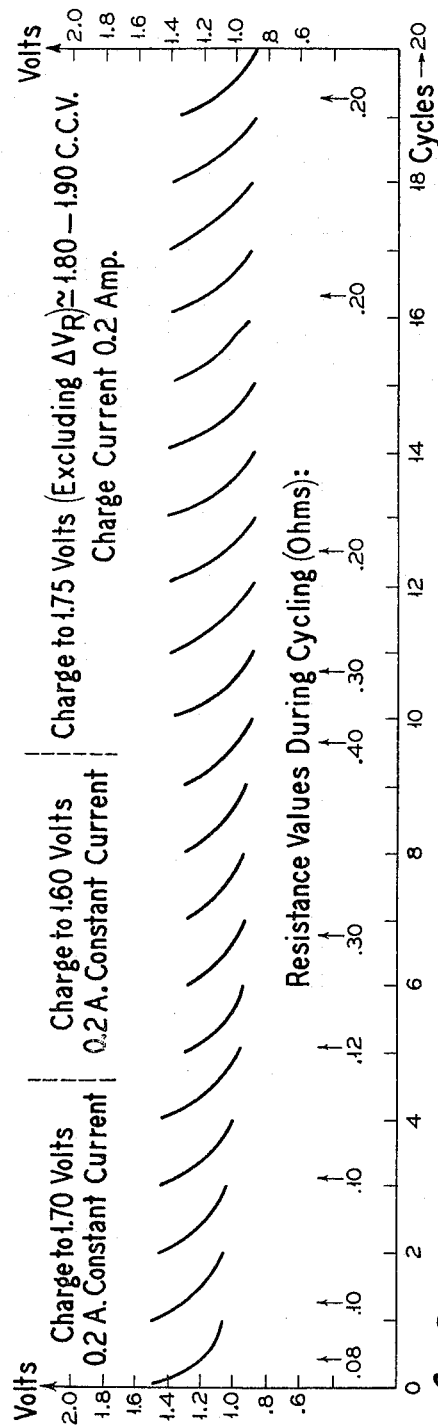
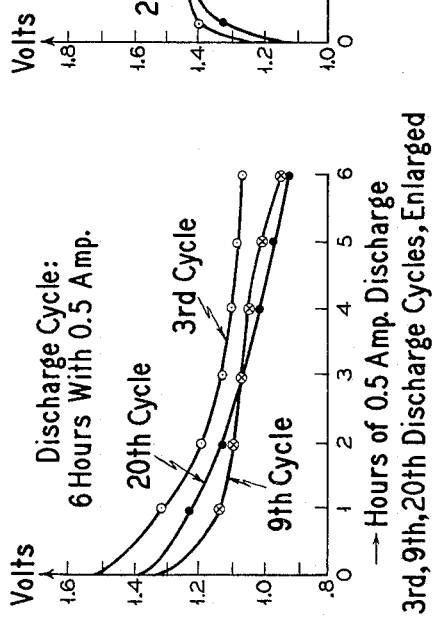
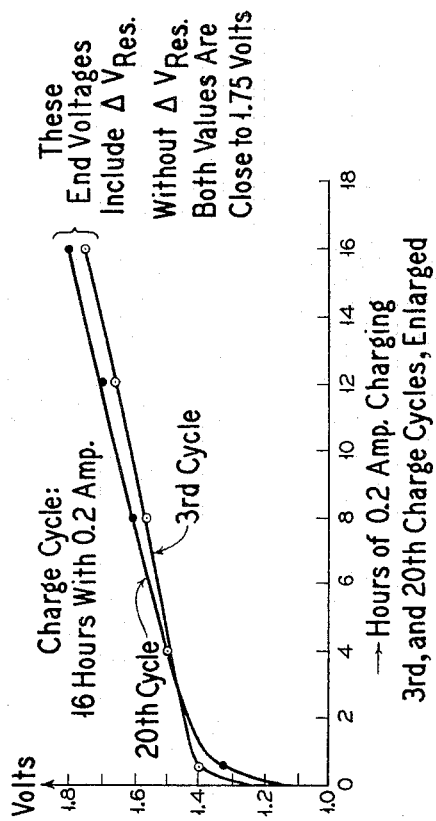
Fig. 3
Fig. 4
Fig. 5
INVENTOR.
KARL V. KORDESCH

INVENTOR.
KARL V. KORDESCH

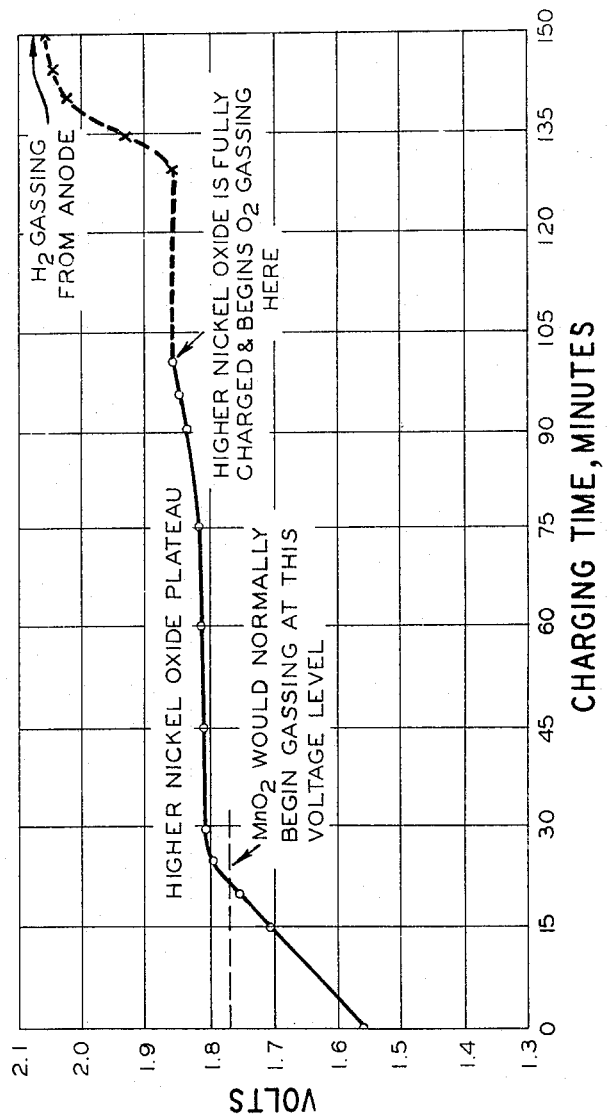

3,288,642
RECHARGEABLE DRY CELL HAVING GELLED ELECTROLYTE
Karl V. Kordesch, Lakewood, Ohio, assignor to Union Carbide Corporation, a corporation of New York
Filed Jan. 5, 1961, Ser. No. 81,668
11 Claims. (Cl. 136—14)

This application is a continuation-in-part of my previous application Serial No. 689,083, filed October 9, 1957, now abandoned.

The present invention is generally concerned with rechargeable dry cells, and more particularly with dry cells employing an oxidic depolarizer in conjunction with an alkaline electrolyte. The invention especially relates to a dry cell of the character indicated, which is adapted to be electrically recharged by passing therethrough an in opposition thereto, a direct current having a voltage greater than its internal electromotive force.

The prior art is amply supplied with suggestions and proposals for recharging LeClanche-type cells. Strictly speaking, these have not been successful primarily because the occurrence of irreversible reactions in the manganese dioxide-ammonium chloride-zinc system presented problems which could not be solved. Typical among such problems were the failure of certain cell-produced precipitates to decompose when contacted with charging current and the frequent disintegration of the cathode upon discharge.

It has been found in accordance with the present invention, however, that a dry cell system employing an oxidic depolarizer, a consumable anode and an alkaline electrolyte, can be recharged many times.

In line with the above stated finding, it is an important object of this invention to provide a dry cell construction which is rechargeable through a number of cycles without appreciable reduction in its high capacity to volume ratio.

It is a further object of this invention to provide a secondary dry cell having a low internal resistance which is retained throughout the life thereof.

Another object of the invention is to provide a cell of the character described which performs advantageously with an inexpensive, low grade, manganese dioxide depolarizing mix.

These and other related objects and advantages of the present construction will become more apparent as the description thereof proceeds, particularly when taken in connection with the accompanying drawing in which FIG. 1 represents a cross-sectional view of the cell of the invention;

FIG. 2 is a cross-sectional view of a separator used in the cell of FIG. 1;

FIGS. 3, 4 and 5 are graphs showing performance data of the cell of FIG. 1;

FIG. 6 is a partial side elevational view showing details of a variant of the invention particularly suitable for heavy duty use;

FIG. 8 is a graph showing the charging characteristics of a cell embodying the principles of this invention and which is depolarized by a mixture of nickel oxide and manganese dioxide and FIG. 9 is a discharge curve for the same cell.

Figure 7:
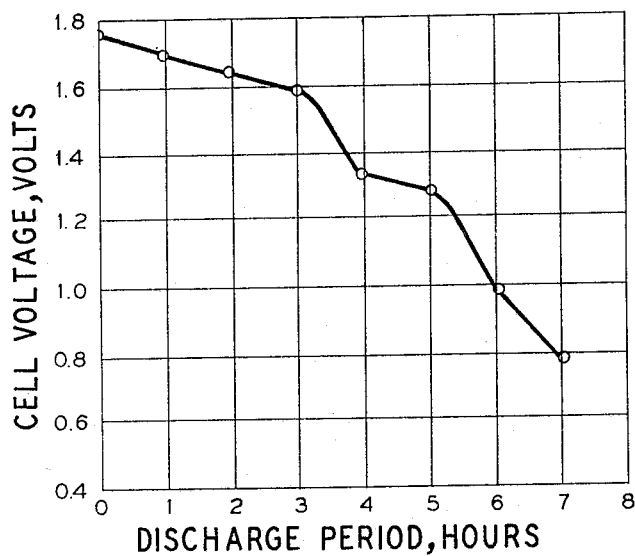
FIG. 7 is graph showing the discharge characteristics of a nickel oxide-depolarized cell according to the invention.

The cell of the invention comprises a depolarizing cathode containing oxidic and graphitic particles and optionally conductive filamentary particles such as steel wool, a powdered anode, an alkaline electrolyte and a separator.

Referring now to FIG. 1, there is shown a cell comprising a cylindrical steel container 10 serving as the positive terminal thereof. Container 10 has an open end and a bottom integral with the container and has a protuberance 12 provided with a blow-out safety vent 14. Fitting snugly within the container is a cylindrical, molded, preferably cement-bonded cathode 16, separated from the container bottom by an elastic spacer 18, normally disposed in a curvi-linear manner, as shown in FIGURES 1 and 6, in order to define an expansion space 20 for cell reaction by-products and for cell gas.

With the previously described elements in place, a separator bag 22, preferably consisting of three layers of material, is inserted in the cell. The separator is closed at the bottom, and may be closed at the top. At this point, anodic particles 25 may be introduced, and a copper screen collector 24, or a perforated metal collector is set down into the center of the cell so that the inside of the screen contains such particles. Alternately, the screen may be inserted first, the space therearound may be filled with anodic particles, such as powdered zinc coated with sodium carboxymethyl cellulose, and a desired amount of anodic particles may be inserted within the screen. After no more free liquid appears on top of the powder, the separator bag is folder together over the top of the powder. A circular elastic spacer 26 is then placed in the cell with its outer periphery resting on top of the cathode and with its center pressing downwardly toward the top of anode collector 24, so as to define a gas expansion space 28 between the spacer and the plastic closing disc 30, which completely seals the cell so as to prevent escape of oxygen therefrom. A copper wire 32 in contact with the anode collector passes through the plastic closing disc and space 28, and is soldered at 33 to a negative terminal plate 34 crimped into disc 30. The cell suitably is closed by crimping the ends of the steel container over the closing disc 30 as shown at 36 and 38.

The cathode used herein is of the type disclosed and claimed in the copending application of K. Kordesch, Serial No. 689,082, now U.S. Patent Serial Number 2,962,540, filed October 9, 1957. A typical composition of such a cathode is as follows:

| | |
|---|---|
| 100 g. | Electrolytic manganese dioxide. |
| 20 g. | Graphite. |
| 10 g. | Portland cement. |
| 5 g. | Steel wool. |
| 12 ml. | 9 normal potassium hydroxide. |

Particularly useful in the present construction are porous cathodes prepared, as disclosed in the application above referred to by forming, crushing and re-bonding the crushed mix.

Inclusion of the steel wool in these cathodes is optional. As much as 40 grams of graphite may be used with the 100 grams of manganese dioxide. Similarly, instead of electrolytic manganese dioxide, low grade ore may be used.

The capacity of the cell anode exceeds that of the cathode by about 50 percent. The cylindrical amalgamated copper screen 24 which serves as anode collector electrochemically shields the zinc inside the screen. Since no current lines exist inside the screen, complete consumption of the zinc contained therein is prevented. Unchanged powdered zinc is then left as a basis for recharging even after a great many cycles.

A typical formulation of an anode suitable for the cell of the invention is as follows:

| | |
|---|---|
| 150 g. | Powdered zinc (through 35 to 100 mesh, 4 percent amalgamated) |
| 5 g. | Sodium carboxy methyl cellulose, high viscosity. |
| 75 ml. | Water. |

In the preparation of the anode, the above components are thoroughly mixed, extruded into thin sheets and dried.

The dry material is later crushed to a particle size between 10 and 20 mesh. To the crushed material, about 10 ml. of 9 normal potassium hydroxide is added to form a gel. It is necessary in the cell of the invention that the anode be inserted therein in gel form. Such a physical state prevents the settling out of small zinc particles. This has been found to be especially important with recharged zinc, which usually has the appearance of fine powder sticking to larger zinc particles left over from the original zinc material. In addition, the gel reduces zincate ion migration, as well as the possibility of zinc tree formation.

As shown in FIG. 2, the separator used in the cell of the invention preferably consists of three layers, and resembles a bag. The middle layer suitably may be a semi-permeable membrane such as the product sold under the trade-name of "Zephyr," and consisting of regenerated cellulose. Preferably, the other two layers can be made from approximately 30 percent "Vinyon" fibers, the balance viscose rayon. "Vinyon" is a vinyl chloride-vinyl acetate copolymer of approximately 80 to 96 percent vinyl chloride content. Viscose rayon is regenerated cellulose film which acts as a matrix for the non-woven "Vinyon" threads. The excellent wet strength of the two "Vinyon" layers protects the softer non-fibrous membrane material from mechanical damage. The excellent wet strength of the two "Vinyon" layers protects the softer "Zephyr" material from mechanical damage caused by steel wool, whiskers or sharp zinc particles. If a more gas-permeable separator is used, less free gas space is needed in the cell and either one of the gas expansion spaces can be omitted.

Performance data for the present cell will be described by pointing out its behavior upon heavy current discharge and light current discharge. FIG. 4 shows the cycling performance of a D-size cell of the invention on heavy current discharge. For this determination a 0.5 ampere current was rated as a reasonably heavy discharge current for a D-size cell, for it was continuously drawn for a period of six hours. By comparison with the cell of the invention, a LeClanche cell of the same size would carry this load for about three hours only with a far wider voltage spread. The total capacity of the cell of the invention under this discharge was 8 to 10 ampere hours. It is advantageous, however, for the cycle life of a cell to take only 30 percent of its rated capacity out, and recharge afterwards. Naturally its full capacity is always available at the cost of further rechargeability. A fresh cell has a total capacity of about 8 ampere hours; with a cell which had been cycled 20 times, a total of about 4 to 5 ampere hours remains to a cut-off voltage of 0.75 volts.

Referring now to the curves of FIG. 3, it can be seen that during the first five cycles, cells were charged to a potential of 1.70 volts with the current on, and for the next five cycles the cells were removed from the charger at 1.60 volts. The result was a lower starting voltage, but also a lower end voltage at discharge. The curves shown represent the average values of four cells. After the tenth cycle, the cell resistance variation ranged between 0.15 ohm and 0.30 ohm.

If the cell is left on load after its cathode is exhausted, the surplus zinc which is still left goes into solution with hydrogen evolution on the cathode. This effect starts at a cell voltage of under 0.4 volts. For this reason a safety vent is incorporated in the cells.

FIG. 5 shows the cycling performance of the cells of the invention on so-called light duty or "trickle" charge. In this type of test the cells were discharged and charged with a current of 0.2 ampere for 16 hours. The discharge-charge cycles were repeated a number of times, and the curves of the drawing reproduce the charging curves for the third cycle and the twentieth cycle. Thus, starting with a 16 hour discharge period, ⅓ of the initial capacity of the cell was removed and from then on the trickle charge cycles were begun. After a total of 110 hours of service on load, the final discharge was made to determine the remaining capacity. The result indicates that the trickle charging procedure kept the batteries in a state of charge corresponding to about half of the fresh cell capacity. Parallel cycling experiments which started with fresh cells ended at about the same level as the initially ⅓ discharged cells.

The ampere hour efficiency of the charge cycles shown in FIG. 4 (0.5 ampere discharge for six hours, 0.2 ampere charge for 16 hours) is quite good, essentially over 80 percent.

Research leading to the foregoing developments and results established that the investigated cell system produces oxygen gas at its cathode if kept on charge too long, and that oxygen thus generated can oxidize the anode, if given access thereto. By means of the arrangement of FIG. 6, any oxygen produced on overcharge can easily reach a sufficiently large zinc powder area, and a pressure build-up within the cell is avoided or at least reduced. This is achieved by inserting in the anode collector cylinder 24, a polyethylene sponge cylinder 40 made extremely electrolyte-repellent by dipping in a 1½ percent paraffin-petroleum ether solution and dried in air. If sufficient oxygen access to the anode is obtained on charging, the polyethylene cylinder may be omitted.

Depolarizers other than manganese dioxide may be used either alone or mixed in the present invention. Thus, a cell was constructed with a zinc anode as described earlier but with a cement-bonded nickel oxide cathode. The cathode formulation was as follows:

| | |
|---|---|
| 100 g. | Nickel oxide |
| 20 g. | Graphite |
| 8 g. | Portland cement |
| 10 ml. | KOH |

Performance of the above cell is illustrated in FIGURE 7, which shows identical initial and third discharge curves. These readings include cell resistance.

Figure 9:
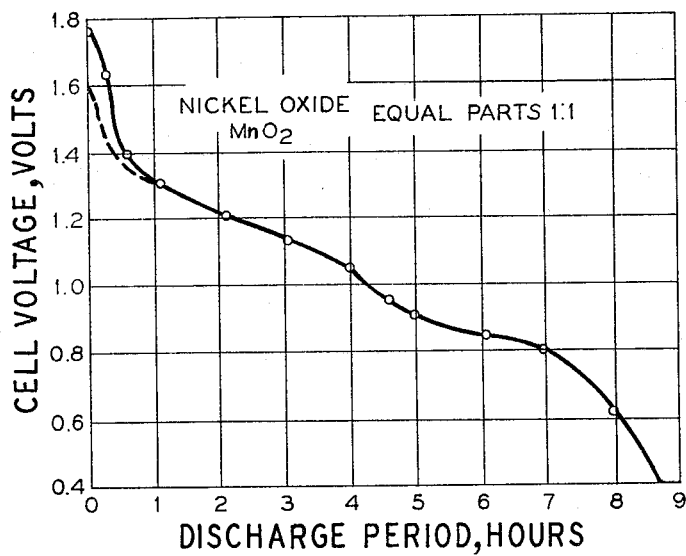

An additional modification of the subject invention is the use of a physical mixture of nickel oxide and manganese dioxide as depolarizer. Manganese dioxide alone often begins gassing during charge at too low a voltage (about 1.65 v.) to assume complete charge of the cathode throughout its body. In order to avoid this difficulty, the addition of nickel oxide to the $MnO_2$ permits raising the voltage at which gassing begins to about 1.85 volts, that of the fully charged nickel oxide. The voltage difference between the $MnO_2$ and the nickel oxide also provides a convenient means of actuating a voltage-sensitive relay in the charging circuit to stop the charging action automatically. If a sufficient amount of nickel oxide is present, a plateau will exist in the charging curve which allows tolerance for the relay to operate. The attached FIGURE 8 illustrates the charging characteristics of a cell having such a mixed nickel oxide-manganese dioxide cathode. FIGURE 9 illustrates typical discharge characteristics of another cell, using the mixed depolarizer composition. The dotted portion in the first hour period shows the cell voltage as it would be if no precharging of the lower voltage nickel oxide to higher oxides is carried out after assembly of the cell. The solid portion above that shows the initially higher voltages which can be obtained by precharging the formed cathode to higher nickel oxides. Precharging may be of particular interest in cases where the cells are stored for long periods of time prior to use. This would be carried out just prior to usage since the high voltage of the charged nickel oxide slowly drops to the $MnO_2$ level on long term storage. Higher oxides of nickel may also be obtained by chemical oxidation of the lower oxide material with agents such as hypohalites prior to incorporation of the depolarizer in the cell. Both the precharging and chemical oxidation techniques are well known in the art as stated in Encyl. Chem. Techn., vol. 9, p. 297.

The concentration range of nickel oxide in the $MnO_2$-nickel oxide mixture may be from about 10 to about 50 parts by weight with 25 parts by weight the preferred concentration. The preferred concentration is determined primarily by the two factors: (1) The fact that ampere-hour capacity of the cells will be determined mainly by the $MnO_2$ content (1 amp.-hr./4 g. $MnO_2$) since the nickel oxide has a much lower capacity per unit weight; and (2) a fairly long plateau in the charging curve is desirable when using automatic voltage-sensitive cut-off devices. Further, the nickel oxide is the more expensive of the two. Therefore, amounts of nickel oxide much lower than 10 parts by weight or much greater than 50 parts by weight in the nickel oxide-$MnO_2$ mixture are undesirable.

The cathode of the cells whose charging and discharging characteristics are shown in FIGURES 8 and 9 was made of the following formulation:

| | |
|---|---|
| 50 g. | $MnO_2$ |
| 50 g. | Nickel oxide |
| 40 g. | Graphite |
| 12 g. | Portland cement |
| 12 ml. | KOH |

These cells gave a 3.5 ampere-hours to 0.8 volt cut-off.

Cells utilizing as little as 10 parts of nickel oxide in the combination have also been successfully operated. A total of 6.5 amperes/hours to a 0.8 volt cut-off was obtained with the 10 percent nickel oxide mixtures.

Another suitable cathode formulation which also makes use of steel wool is the following:

| | |
|---|---|
| 50 g. | Manganese dioxide |
| 50 g. | Nickel oxide |
| 12 g. | Portland cement |
| 20 g. | Graphite |
| 5 g. | Steel wool |
| 12 ml. | Potassium hydroxide |

Other modifications of the subject invention include the use of powdered cadmium anodes (made in the same manner as the zinc anodes), in systems such as cadmium-manganese-dioxide. While the use of cement as a binder is not as necessary with other oxides as it is with manganese dioxide, it does make possible the fabrication of a strong cathode member from any particulate depolarizer material, with the cement forming a continuous matrix throughout the cathode. An obvious modification of the present structure is to provide a non-curvilinear expansion space either at the bottom or at the top of the cell. It will be appreciated, however, that the preferred configuration is curvilinear since the same permits more efficient utilization of cell space.

What is claimed is:

1. A rechargeable dry cell comprising a metallic container serving as the cathode terminal thereof and having an integral bottom and an opposite sealed end; an annular cathode fitting snugly in the container; an anode composed of finely divided anodic particles with a gelled alkaline electrolyte and situated within the annulus of the cathode; a semi-permeable separator means disposed between the anode and the cathode; an elastic spacer means extending over the lower extremity of the cathode annulus and defining an expansion space between the spacer means and the container bottom; an anode collector means in contact with the anode; and contact means passing through the sealed end and electrically contacting the anode collector means; said anode providing sufficient surface and quantity of anodic material to combine with oxygen released during overcharging of the cell and the separator means providing a path to the anode for oxygen produced in the cell during overcharge.

2. A rechargeable dry cell comprising a metallic container serving as the cathode terminal thereof and having an integral bottom and opposite sealed end; an annular cathode fitting snugly in the container; an anode composed of finely divided anodic particles with a gelled alkaline electrolyte and situated within the annulus of the cathode; a semi-permeable separator means disposed between the anode and the cathode; a first elastic spacer means extending over the lower extremity of the cathode annulus and defining an expansion space between the spacer means and the container bottom; a second elastic spacer means extending over the upper extremity of the cathode annulus and defining an expansion space between the second spacer means and the sealed end; an anode collector means in contact with the anode; and contact means passing through the sealed end and electrically contacting the anode collector means; said anode providing sufficient surface and quantity of anodic material to combine with oxygen released during overcharging of the cell and the separator means providing a path to the anode for oxygen produced in the cell during overcharge.

3. The cell of claim 2, wherein said cathode is composed of manganese dioxide, graphite, steel wool, and is bonded by means of cement and wherein an electrolyte-repellant sponge cyclinder is situated within said anode collector means.

4. The cell of claim 2, wherein said anode particles are in gel form, and are coated with a metal salt of carboxymethyl cellulose and wherein an electrolyte-repellent polyethylene sponge cylinder is situated within said anode collector means.

5. The cell of claim 2, wherein said separator means consists of a plurality of layers, the middle one of which is a semi-permeable membrane, and those surrounding the same are composed of fibrous cellulose.

6. A rechargeable dry cell comprising a cylindrical steel container serving as the cathode terminal thereof and having an integral bottom and an opposite sealed end; an annular, molded, cement-bonded cathode fitting in the container; an anode comprised of finely-divided anodic particles with a gelled alkaline electrolyte and situated within the annulus of the cathode; a first elastic spacer means separating the lower end of the cathode and of the anode from the bottom of the container; a separator bag, consisting of two layers of fibrous cellulosic material and a semi-permeable membrane therebetween, fitting over the top of the anodic particles and intermediate the anode and the cathode; a screen cyclinder serving as an anode collector in contact with the anodic particles and adapted to contain a portion thereof; a second elastic spacer means resting on top of the cathode and defining an expansion space between the cathode and the sealed end; and wire contact means passing through the sealed end and the second spacer means to contact the anode collector; said bottom of the container being provided with a protuberance having a blow-out safety vent and said spacer means being normally disposed in a curvilinear manner so as to define an expansion space at each end of the cell.

7. A rechargeable dry cell comprising a cylindrical steel container serving as the positive terminal thereof and having an integral bottom and an opposite sealed end, the bottom of said container having a proturberance provided with a blow-out safety vent, said protuberance serving also as contact means; an annular, molded, cement-bonded cathode fitting in said container; an anode comprised of finely-divided anodic particles gelled with an alkaline electrolyte and situated within the annulus of said cathode elastic spacer means for separating the lower ends of said cathode and said anode from the bottom of said container, said spacer means being normally disposed in a curvilinear manner to define an expansion space for cell reaction by-products between said anode and said container bottom, said anode comprising finely divided metal salt of carboxymethyl cellulose-coated zinc particles mixed with potassium hydroxide electrolyte, a separator bag consisting of two layers of fibrous cellulosic material confining a semi-permeable membrane, said bag fitting over the top of said zinc particles intermediate said anode and cathode; a screen cyclinder serving as an anode collector in contact with said zinc particles; an elastic spacer member resting on the top of said cathode defining an expansion space intermediate said spacer means and said sealed end and wire contact means passing through said closure and said spacer means to contact said anode collector means.

8. The cell of claim 7, wherein said screen cylinder serving as anode collector contains an electrolyte-repellent polyethylene sponge cylinder to conduct oxygen produced in cell overcharge to a sufficiently large zinc powder area, and avoid pressure build-up in said cell.

9. The cell in accordance with claim 7 wherein the cathode is composed of 50 parts by weight manganese dioxide, from about 10 to about 50 parts by weight nickel oxide, 40 parts by weight graphite, and 12 parts by weight Portland cement.

10. The cell in accordance with claim 9 wherein the screen cyclinder serving as anode collector contains an electrolyte-repellent polyethylene sponge cyclinder adapted to distribute oxygen produced in the cell during overcharge over a sufficiently large area of zinc particles and avoiding pressure build-up in the cell.

11. The cell in accordance with claim 7 wherein the cathode is composed of 50 parts by weight manganese dioxide, 50 parts by weight nickel oxide, 12 parts by weight Portland cement, 20 parts by weight graphite, and 5 parts by weight steel wool.

References Cited by the Examiner

UNITED STATES PATENTS

| | | | |
|---|---|---|---|
| 1,442,238 | 1/1923 | Smith | 204—56 |
| 2,154,312 | 4/1939 | MacCallum | 136—127 |
| 2,422,045 | 6/1947 | Ruben | 136—107 |
| 2,463,316 | 3/1949 | Ruben | 136—107 |
| 2,542,574 | 2/1951 | Ruben | 135—107 |
| 2,635,127 | 4/1953 | Yardney et al. | 136—6.2 |
| 2,810,008 | 10/1957 | Bikerman | 136—127 |
| 2,824,165 | 2/1958 | Marsal | 136—122 |
| 2,880,122 | 3/1959 | Morehouse et al. | 136—137 |
| 2,874,079 | 2/1959 | Lozier et al. | 136—137 |
| 2,951,106 | 8/1960 | Ruetschi | 136—6 |
| 2,980,747 | 4/1961 | Daley | 136—6 |
| 3,023,258 | 2/1962 | Peters | 136—6 |

FOREIGN PATENTS

| | | |
|---|---|---|
| 17,861 | 8/1891 | Great Britain. |
| 653,235 | 5/1951 | Great Britain. |
| 741,345 | 11/1955 | Great Britain. |

WINSTON A. DOUGLAS, *Primary Examiner.*

JOHN R. SPECK, JOHN H. MACK, MURRAY TILLMAN, J. BARNEY, B. J. OHLENDORF,
*Assistant Examiners.*